US012592052B2

(12) United States Patent
Kondo et al.

(10) Patent No.: US 12,592,052 B2
(45) Date of Patent: Mar. 31, 2026

(54) INFORMATION PROCESSING DEVICE AND INFORMATION PROCESSING METHOD

(71) Applicant: SONY GROUP CORPORATION, Tokyo (JP)

(72) Inventors: Yuhi Kondo, Tokyo (JP); Taishi Ono, Tokyo (JP); Legong Sun, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 319 days.

(21) Appl. No.: 18/250,690

(22) PCT Filed: Sep. 16, 2021

(86) PCT No.: PCT/JP2021/034074
§ 371 (c)(1),
(2) Date: Apr. 26, 2023

(87) PCT Pub. No.: WO2022/097377
PCT Pub. Date: May 12, 2022

(65) Prior Publication Data
US 2023/0410457 A1 Dec. 21, 2023

(30) Foreign Application Priority Data

Nov. 4, 2020 (JP) ................................. 2020-184223

(51) Int. Cl.
*G06V 10/25* (2022.01)
*G06V 10/14* (2022.01)
*G06V 10/75* (2022.01)
(52) U.S. Cl.
CPC .............. *G06V 10/25* (2022.01); *G06V 10/14* (2022.01); *G06V 10/751* (2022.01)
(58) Field of Classification Search
CPC .......... G06T 7/00; G06V 10/14; G06V 10/25; G06V 10/751
See application file for complete search history.

(56) References Cited

U.S. PATENT DOCUMENTS

2012/0147187 A1* 6/2012 Li ........................... G06V 20/58
348/148

FOREIGN PATENT DOCUMENTS

CN 111492198 A 8/2020
WO WO2019063341 * 4/2019 .......... B60W 30/143

OTHER PUBLICATIONS

International Search Report and Written Opinion of PCT Application No. PCT/JP2021/034074, issued on Nov. 30, 2021, 11 pages of ISRWO.

(Continued)

*Primary Examiner* — Zhiyu Lu
(74) *Attorney, Agent, or Firm* — CHIP LAW GROUP

(57) ABSTRACT

Provided is a polarized imaging unit that captures time-series polarized images of an object. A polarization information calculating unit calculates polarization information for each polarized image from the time-series polarized images captured by the polarized imaging unit. An object specifying unit specifies the image region of the object on the basis of, for example, a non-polarized image generated by a non-polarized image generating unit on the basis of the polarized image. A state-change detecting unit detects a state change of the object on the basis of a time series change of the polarization information in the image region of the object specified by the object specifying unit. An output unit outputs the detection result of a state change such that the detection result is associated with the non-polarized image generated by the non-polarized image generating unit, the detection result being obtained by the state-change detecting unit.

17 Claims, 12 Drawing Sheets

(56)        References Cited

OTHER PUBLICATIONS

Yamada, et al., "A Study of the Road Surface Condition Detection
Technique based on the Image Information for Deployment on a
Vehicle", Institute Of Electrical Engineers Of Japan, Transactions
on Electronics, Information and Systems Society Publication, vol.
124, No. 3, Mar. 1, 2004, pp. 753-760.

* cited by examiner

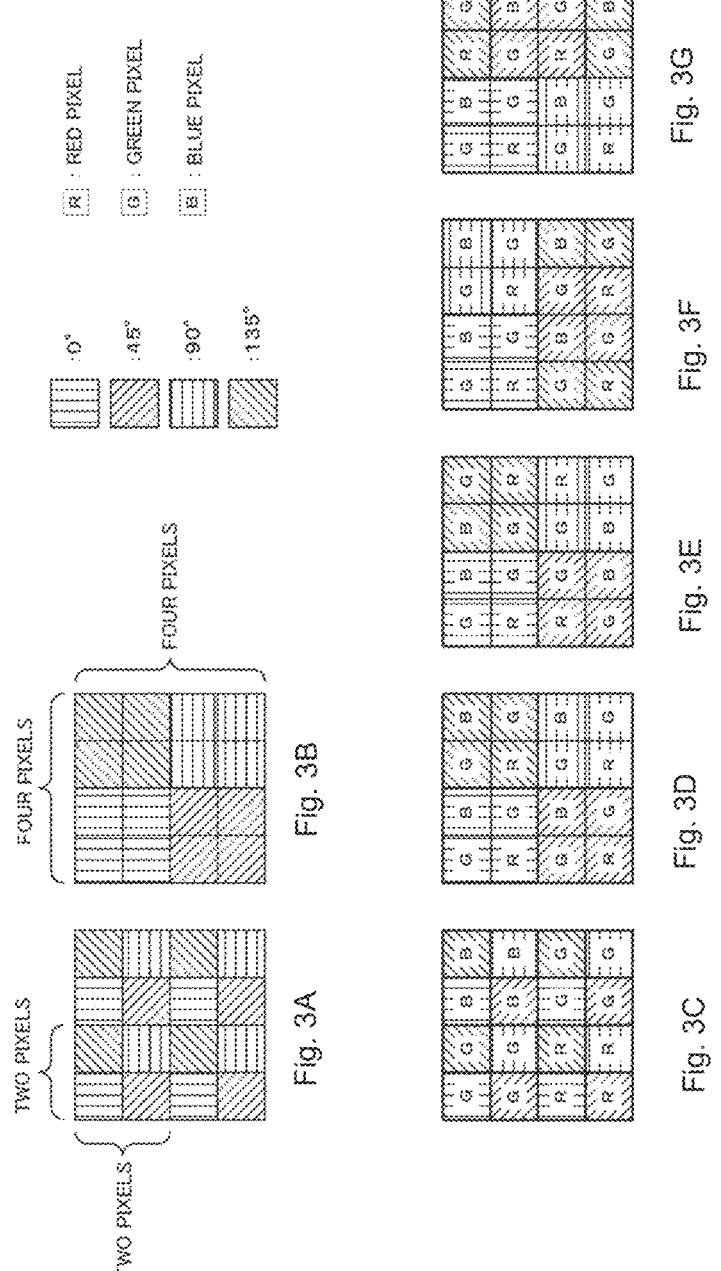

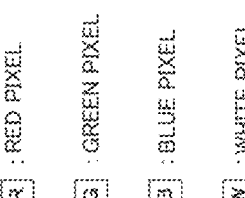
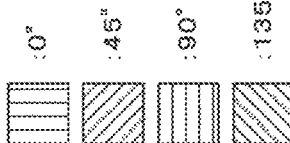
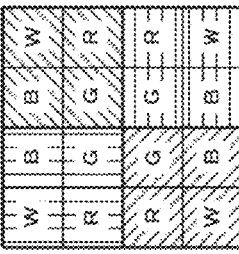
Fig. 4B
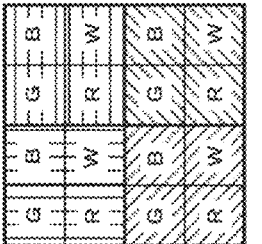
Fig. 4A

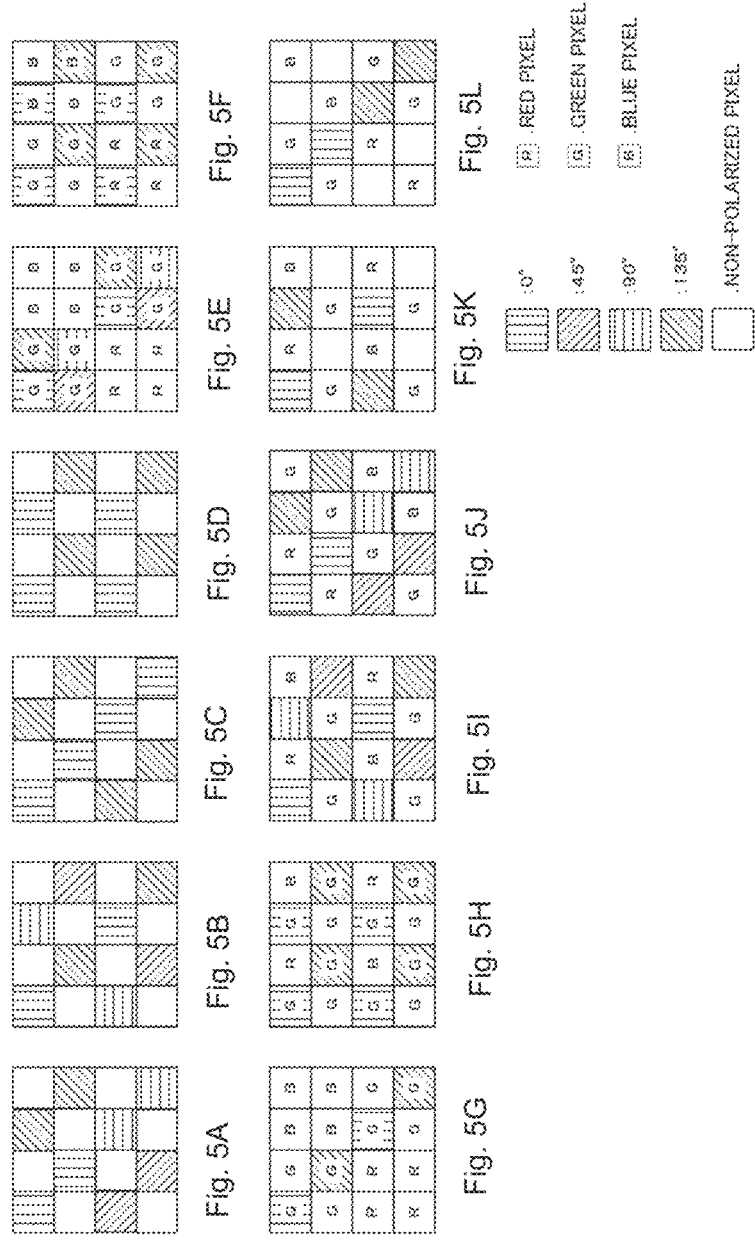

Fig. 10A
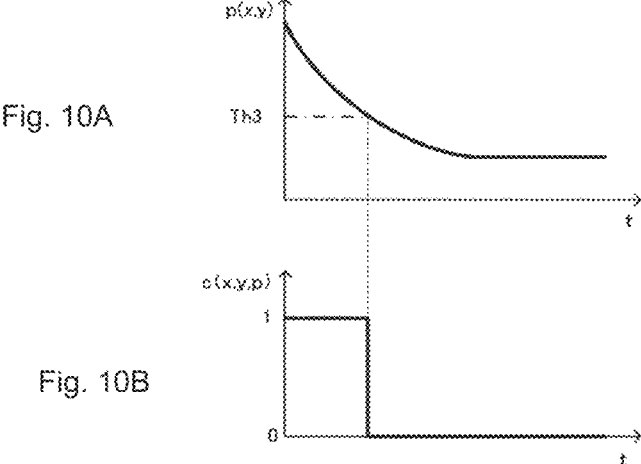
Fig. 10B
Fig. 10C
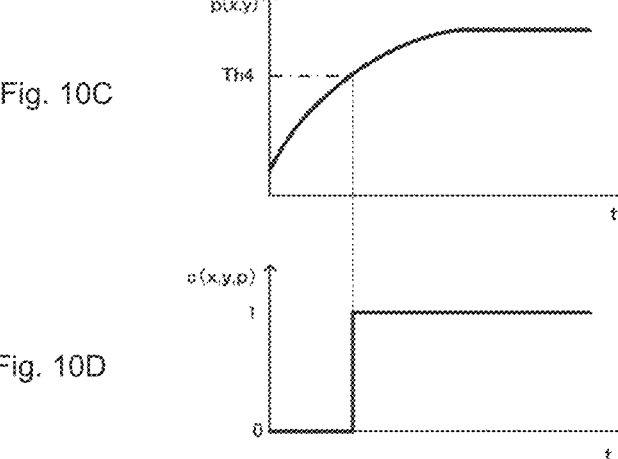
Fig. 10D

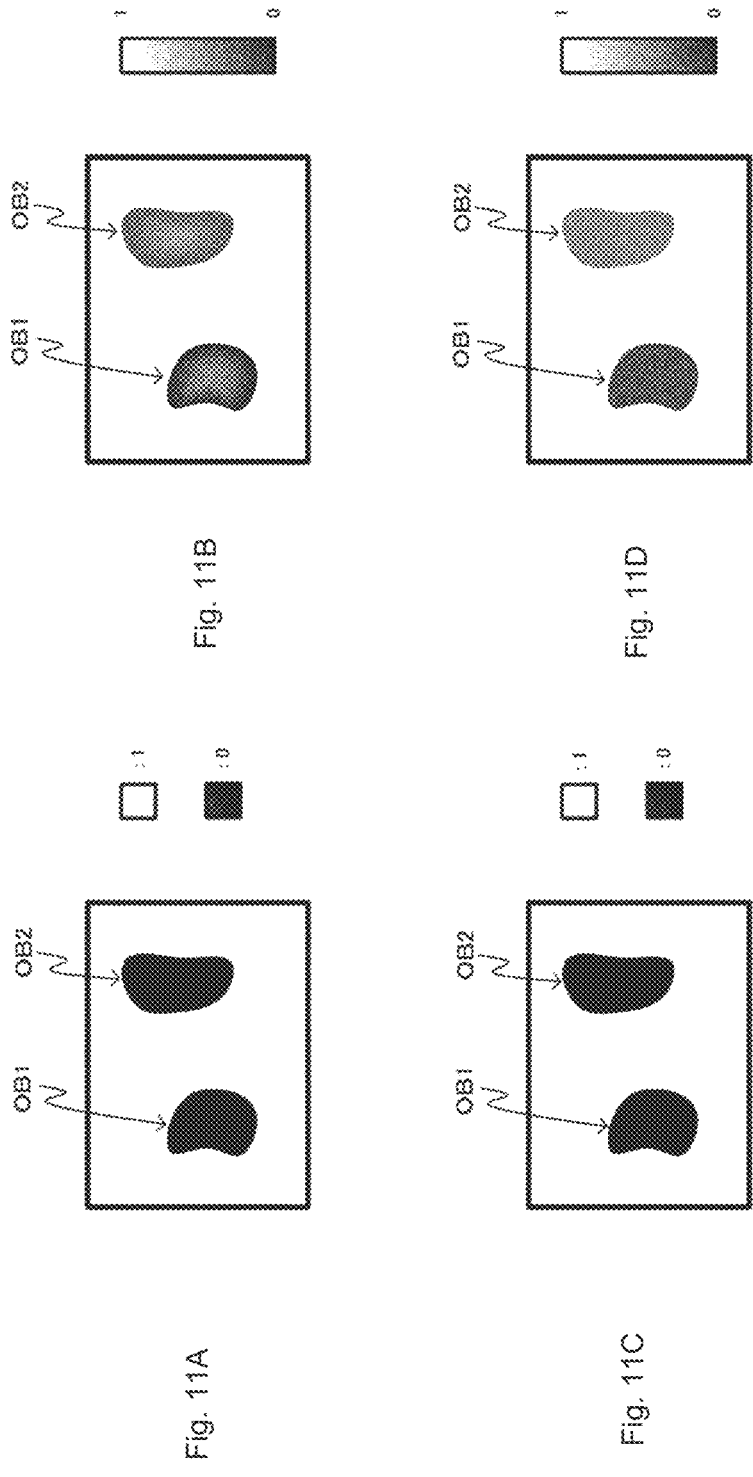

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/034074 filed on Sep. 16, 2021, which claims priority benefit of Japanese Patent Application No. JP 2020-184223 filed in the Japan Patent Office on Nov. 4, 2020. Each of the above-referenced applications is hereby incorporated herein by reference in its entirety.

TECHNICAL FIELD

The present technique relates to an information processing device, an information processing method, and a program and detects a state change of an object.

BACKGROUND ART

Conventionally, a state change of an object is determined on the basis of a temperature. For example, in PTL 1, an atmospheric temperature and a temperature of laundry as an object are compared with each other, and whether the laundry has dried or not is determined as a state change of the object on the basis of the comparison result.

CITATION LIST

Patent Literature

[PTL 1]
    JP H06-347428 A

SUMMARY

Technical Problem

If a state change of an object is determined on the basis of a temperature, a state change cannot be determined in a part where a temperature is not measured. Hence, in order to determine a state change of an object with a high resolution, the use of an expensive high-resolution thermometer is necessary, leading to difficulty in determining a state change of an object with a high resolution with ease.

Therefore, an object of the present technique is to provide an information processing device, an information processing method, and a program that can easily detect a state change of an object.

Solution to Problem

A first aspect of the present technique is
an information processing device including: a polarization information calculating unit that calculates polarization information for each polarized image from time-series polarized images of an object; and
a state-change detecting unit that detects a state change of the object on the basis of a time series change of the polarization information calculated by the polarization information calculating unit.

In this technique, the polarization information calculating unit calculates one or different pieces of polarization information for each polarized image from time-series polarized images of the object. The state-change detecting unit calculates a state change index indicating the time series change of the polarization information calculated by the polarization information calculating unit, for each pixel position, each piece of the polarization information, each object region, or each polarized image and detects a state change of the object on the basis of the state change index. For example, the state-change detecting unit detects that a change of the polarization information becomes smaller than a predetermined change with the passage of time or a change of the polarization information becomes larger than the predetermined change. Furthermore, the state-change detecting unit integrates the state change indexes for each pixel in an image region indicating the object or each object and detects the state change of the object on the basis of the integrated state change index. In the integration of the state change indexes, the state-change detecting unit assigns a weight to the state change index for each pixel in the image region indicating the object or each image region indicating the object and integrates the state change indexes assigned with weights. The state-change detecting unit increases the weight of polarization information having high reliability.

An object specifying unit specifies the image region of the object in the polarized image. The object specifying unit performs recognition by using, for example, a non-polarized image generated by a non-polarized image generating unit and specifies the image region of the object.

The information processing device includes an output unit that outputs the detection result of a state change of the object, the detection result being obtained by the state-change detecting unit. For example, the output unit associates the state-change detection result obtained by the state-change detecting unit with the non-polarized image generated by the non-polarized image generating unit, performs image processing on the non-polarized image according to the detection result of the state change, and outputs the image.

A second aspect of the present technique is
an information processing method including: calculating by a polarization information calculating unit polarization information for each polarized image from time-series polarized images of an object; and
    detecting by a state-change detecting unit a state change of the object on the basis of a time series change of the polarization information calculated by the polarization information calculating unit.

A third aspect of the present technique is
a program that causes a computer to detect a state change of an object, the program causing the computer to:
    calculate polarization information for each polarized image from time-series polarized images of the object; and
    detect a state change of the object on the basis of a time series change of the calculated polarization information.

BRIEF DESCRIPTION OF DRAWINGS

FIGS. 2A, 2B, 2C, and 2D illustrate the configuration of a polarized imaging unit.
[FIGS. 3A, 3B, 3C, 3D, 3E, 3F, and 3G]
FIGS. 3A, 3B, 3C, 3D, 3E, 3F, and 3G illustrate pixel configurations in a plurality of polarization directions.

[FIGS. 4A and 4B]

FIGS. 4A and 4B illustrate pixel configurations (three-primary color pixels and white pixels) in a plurality of polarization directions.

[FIGS. 5A, 5B, 5C, 5D, 5E, 5F, 5G, 5H, 5I, 5J, 5K, and 5L]

FIGS. 5A, 5B, 5C, 5D, 5E, 5F, 5G, 5H, 5I, 5J, 5K, and 5L illustrate pixel configurations (non-polarized pixels) in a plurality of polarization directions.

FIG. 6 is a flowchart showing the operations of the embodiment.

FIG. 7 is a flowchart showing the detection of a state change.

FIGS. 8A, 8B, 8C, and 8D illustrate operations if it is detected that a change of polarization information becomes smaller than a predetermined change with the passage of time.

FIGS. 9A, 9B, 9C, and 9D illustrate operations if it is detected that a change of the polarization information becomes larger than the predetermined change with the passage of time.

[FIGS. 10A, 10B, 10C, and 10D]

FIGS. 10A, 10B, 10C, and 10D illustrate the setting of a state change index on the basis of the result of comparison between the polarization information and a threshold value.

[FIGS. 11A, 11B, 11C, and 11D]

FIGS. 11A, 11B, 11C, and 11D illustrate the output of the detection result of a state change alone.

FIGS. 12A, 12B, 12C, 12D, 12E, and 12F illustrate the detection result of a state change and a non-polarized image that are outputted while being associated with each other.

DESCRIPTION OF EMBODIMENTS

An embodiment for implementing the present technique will be described below. Here, the description will proceed in the following order.

1. Configuration of Embodiment
2. Operation of Embodiment
3. Application Examples

1. Configuration of Embodiment

Figure 1:
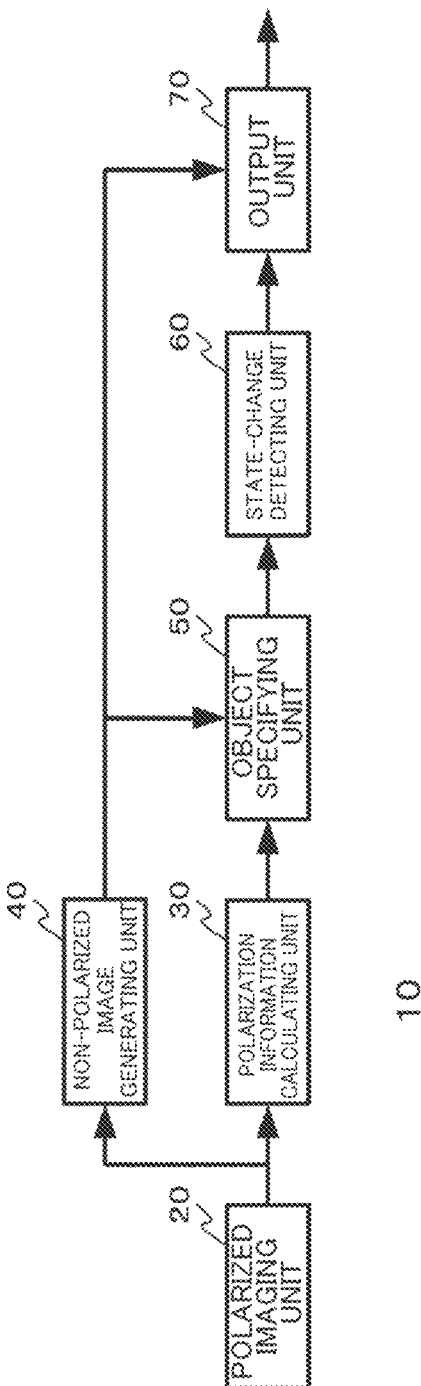
FIG. 1 illustrates the configuration of an embodiment.

FIG. 1 illustrates the configuration of the embodiment according to the present technique. An information processing system 10 includes a polarized imaging unit 20 that captures a polarized image, a polarization information calculating unit 30 that calculates polarization information for each image from time-series polarized images captured by the polarized imaging unit 20, an object specifying unit 50 that specifies an object for which a state change is to be detected, a state-change detecting unit 60 that detects a state change of the object on the basis of a time series change of the polarization information calculated by the polarization information calculating unit 30, and an output unit 70 that outputs the detection result of the state change of the object. Alternatively, the information processing system 10 may include a non-polarized image generating unit 40 that generates a non-polarized image from a polarized image captured by the polarized imaging unit 20, the object specifying unit 50 may specify an object on the basis of the non-polarized image, and the output unit 70 may output the detection result of a state change such that the detection result is associated with the non-polarized image. The non-polarized image generating unit 40 is provided in the following description.

Figures 2A, 2B, 2C, 2D:
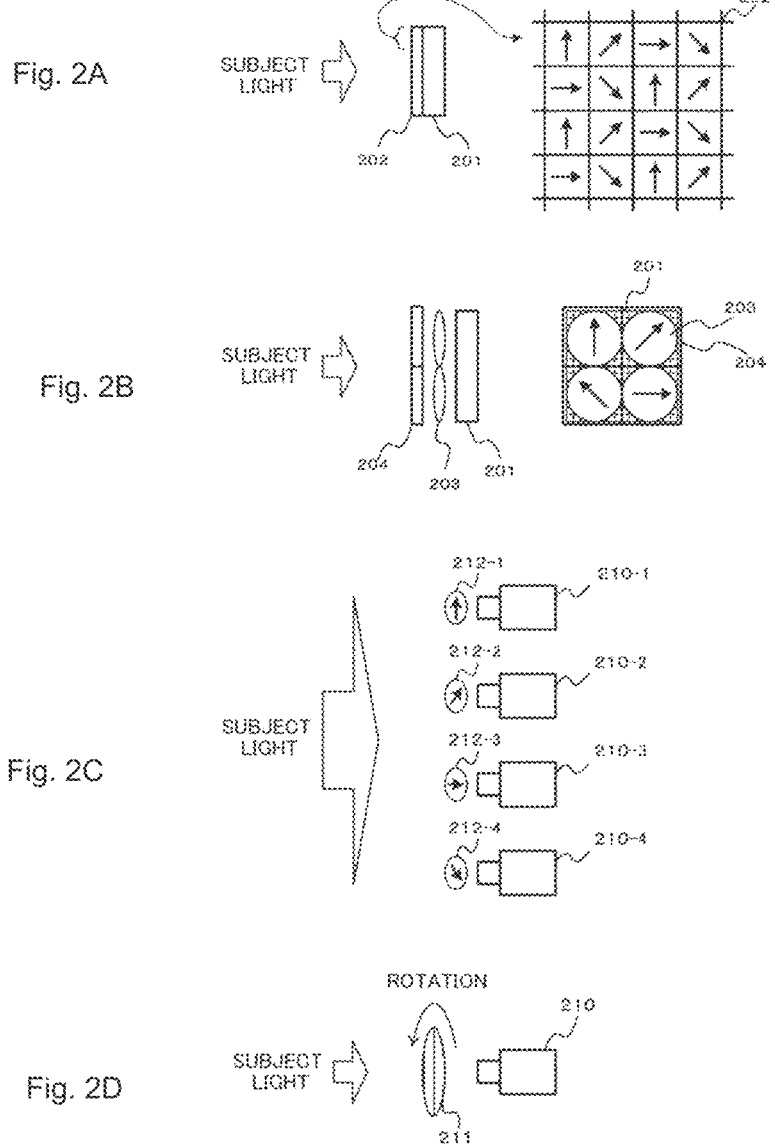
[FIGS. 2A, 2B, 2C, and 2D]

FIGS. 2A, 2B, 2C, and 2D illustrate the configuration of the polarized imaging unit. The polarized imaging unit 20 performs imaging using polarizing elements and captures a polarized image. For example, as illustrated in FIG. 2A, the polarized imaging unit 20 captures a polarized image with a polarizing filter 202 disposed on an image sensor 201 of a CMOS (Complementary Metal Oxide Semiconductor) or a CCD (Charge Coupled Device) and the like, the polarizing filter 202 having a pixel configuration with a plurality of polarization directions. The polarizing filter 202 may be, for example, a wire grid or a photonic crystal if linear polarized light can be extracted from subject light indicating an object. The arrows of the polarizing filter 202 and polarizing plates 204 and 212-1 to 212-4, which will be described later, indicate polarization directions.

As illustrated in (b) of FIG. 2B, the polarized imaging unit 20 may generate a plurality of polarized images in different polarization directions by using the configuration of a multi-lens array. For example, a plurality of lenses 203 (four in (b) of FIG. 2B) are provided in front of the image sensor 201, and each of the lenses 203 forms an optical image of an object on the imaging surface of the image sensor 201. Moreover, the polarizing plates 204 are provided in front of the respective lenses 203, and a plurality of polarized images are generated in different polarization directions through the polarizing plates 204 having different polarization directions. The polarized imaging unit 20 configured thus can capture a plurality of polarized images in one shot, thereby quickly recognizing an object. As illustrated in FIG. 2C, the polarizing plates 212-1 to 212-4 having different polarization directions may be provided in front of imaging units 210-1 to 210-4 so as to generate a plurality of polarized images in different polarization directions from different points of view.

If an object moves slowly or operates in steps, as illustrated in (d) of FIG. 2D, a polarizing plate 211 may be provided in front of an imaging unit 210. In this case, the polarizing plate 211 is rotated to capture images in the different polarization directions, so that a plurality of polarized images are obtained in different polarization directions.

In the case of FIGS. 2B and 2C, if intervals between the lenses 203 or the imaging units 210-1 to 210-4 are negligibly short relative to a distance to an object, parallax is negligible in a plurality of polarized images having different polarization directions. Thus, an image equivalent to a non-polarized normal brightness image can be obtained by averaging the brightness of the polarized images having different polarization directions. If parallax is not negligible, polarized images having different polarization directions are aligned according to the amount of parallax and the brightness of the aligned images is averaged, so that an image equivalent to a non-polarized normal brightness image can be obtained. In the case of (d) of FIG. 2D, the brightness of polarized images having different polarization directions is averaged for each pixel, so that an image equivalent to a non-polarized normal brightness image can be obtained.

FIGS. 3A, 3B, 3C, 3D, 3E, 3F, 3G, 4A, 4B, 5A, 5B, 5C, 5D, 5E, 5F, 5G, 5H, 5I, 5J, 5K, and 5L illustrate pixel configurations in multiple polarization directions. The illustrated configurations are repeated in the horizontal direction and the vertical direction. FIGS. 3A and 3B illustrate pixel configurations when a black and white image is captured. FIG. 3A illustrates a polarization pixel block of 2 by 2 pixels including, for example, polarized pixels in the polarization directions (polarizing angles) of 0°, 45°, 90°, and 135°. FIG. 3B illustrates a polarization pixel block of 4 by 4 pixels including, for example, polarized pixels in the polarization directions of 0°, 45°, 90°, and 135° while 2 by 2 pixels serve as a unit in the polarization direction. If the unit of the polarization components of the polarizing filter is 2 by 2 pixels as illustrated in (b) of FIG. 3B, the ratio of leakage of polarization components from an adjacent region of a different unit of polarization components relative to polarization components obtained for the unit of polarization components is smaller than that of 1 by 1 pixel in FIG. 3A. If a wire grid is used for the polarizing filter, polarized light including field components in the vertical direction relative to the grid direction (wire direction) is passed. The transmittance increases with the wire length. Thus, if the unit of polarization components is 2 by 2 pixels, the transmittance is higher than that of 1 by 1 pixel. For this reason, 2 by 2 pixels as the unit of polarization components have higher transmittance than 1 by 1 pixel, thereby improving the extinction ratio.

FIGS. 3C, 3D, 3E, 3F, and 3G illustrate pixel configurations when a color image is captured. FIG. 3C illustrates three-primary color pixels (red pixels, green pixels, and red pixels) in a Bayer layout where the polarization pixel block of 2 by 2 pixels in FIG. 3A serves as a color unit.

FIG. 3D illustrates three-primary color pixels provided in a Bayer layout for each pixel block of 2 by 2 pixels in the same polarization direction in FIG. 3B.

FIG. 3E illustrates three-primary color pixels provided in a Bayer layout for each pixel block of 2 by 2 pixels in the same polarization direction while a block of 2 by 2 pixels in different polarization directions has pixels of the same color.

FIG. 3E illustrates a pixel block of 2 by 2 pixels in the same polarization direction in a Bayer layout, in which a phase difference from an adjacent pixel block in the horizontal direction is 90 in the polarization direction and a phase difference from an adjacent pixel block in the vertical direction is ±45 degree in the polarization direction.

FIG. 3G illustrates a pixel block of 2 by 2 pixels in the same polarization direction in a Bayer layout, in which a phase difference from an adjacent pixel block in the vertical direction is 90 in the polarization direction and a phase difference from an adjacent pixel block in the horizontal direction is ±45 degree in the polarization direction.

FIGS. 4A and 4B illustrate the provision of three-primary color pixels and white pixels. For example, FIG. 4A illustrates a white pixel having replaced one of the green pixels in the pixel block of 2 by 2 pixels in the same polarization direction in a Bayer layout shown in (d) of FIG. 3D.

FIG. 4B illustrates a white pixel having replaced one of the green pixels in the pixel block of 2 by 2 pixels in the same polarization direction in a Bayer layout shown in FIG. 3E while a block of 2 by 2 pixels in different polarization directions has pixels of the same color.

As disclosed in WO 2016/136085, the provision of white pixels can obtain a larger dynamic range in the generation of normal line information than in the absence of white pixels. Moreover, white pixels have a proper S/N ratio and thus are less susceptible to noise in, for example, the calculation of a color difference.

FIGS. 5A, 5B, 5C, 5D, 5E, 5F, 5G, 5H, 5I, 5J, 5K, and 5L illustrate the provision of non-polarized pixels. FIGS. 5A, 5B, 5C, and 5D illustrate the acquisition of a black and white image, and FIGS. 5E, 5F, 5G, 5H, 5I, 5J, 5K, and 5L illustrate the acquisition of a color image. The polarization directions and color pixels are displayed as in FIGS. 3A, 3B, 3C, 3D, 3E, 3F, and 3G.

FIG. 5A illustrates non-polarized pixels having replaced polarized pixels diagonally placed in a pixel block of 2 by 2 pixels in the same polarization direction in FIG. 3B.

FIG. 5B illustrates polarized pixels diagonally provided with a phase difference of 45 degrees in a pixel block of 2 by 2 pixels, the polarized pixels having a phase difference of 90 degrees from an adjacent pixel block.

FIG. 5C illustrates polarized pixels diagonally provided in the same polarization direction in a pixel block of 2 by 2 pixels, the polarized pixels having a phase difference of 45 degrees from an adjacent pixel block. The pixels are polarized in two directions with a phase difference of 45 degrees. Polarization information may be acquired from non-polarized pixels and polarized pixels in two polarization directions according to a technique disclosed in, for example, WO 2018/074064.

FIG. 5D illustrates polarized pixels diagonally provided with a phase difference of 45 degrees in a pixel block of 2 by 2 pixels, the pixels being polarized in two directions with a phase difference of 45 degrees.

FIG. 5E illustrates pixel blocks (2 by 2 pixels) of the same color in a Bayer layout in which a pixel block of 4 by 4 pixels is configured using two pixel blocks of 2 by 2 pixels in four different polarization directions and two pixel blocks of 2 by 2 pixels including non-polarized pixels such that the pixel blocks of the polarized pixels are provided as green pixels and the pixel blocks of the non-polarized pixels are provided as red pixels or blue pixels.

FIG. 5E illustrates polarized pixels provided as in FIG. 5D and pixel blocks of three primary colors in a Bayer layout in which a color unit is a pixel block including two polarized images in different polarization directions and two non-polarized pixels.

FIG. 5G illustrates pixel blocks of three primary colors in a Bayer layout in which a color unit is a pixel block of 2 by 2 pixels. The pixel block of green pixels includes two polarized pixels in different polarization directions.

FIG. 5H illustrates polarized pixels provided as FIG. 5D. The pixel block including two polarized images in different polarization directions and two non-polarized pixels has three green pixels and one red pixel that is one of the non-polarized pixels. In an adjacent pixel block, one of the non-polarized pixels is a blue pixel.

FIGS. 5I and 5J illustrate pixels of three primary colors in a pixel block of 4 by 4 pixels including non-polarized pixels as color pixels. FIGS. 5K and 5L illustrate pixels of three primary colors in a pixel block of 4 by 4 pixels including non-polarized pixels some of which serve as color pixels.

The configurations in FIGS. 3A, 3B, 3C, 3D, 3E, 3F, 3G, 4A, 4B, 5A, 5B, 5C, 5D, 5E, 5F, 5G, 5H, 5I, 5J, 5K, and 5L are merely exemplary and other configurations may be used instead. A configuration with mixed infrared (IR) pixels may be repeated to enable high-sensitivity imaging in, for example, the nighttime.

Polarization information calculated by the polarization information calculating unit 30 will be described below. When a polarizing plate is set perpendicularly to an observation direction to observe partially polarized light through the polarizing plate, the brightness of transmitted light changes each time the polarizing plate is rotated. When a two-dimensional coordinate system (x axis and y axis) is defined on the plane of the polarizing plate that is rotated to have the maximum brightness Imax and the minimum brightness Imin, a polarizing angle υ formed by a rotation of the polarizing plate is defined as an angle formed by the polarizing axis of the polarizing plate and the x axis and is expressed as an angle formed from the x axis to the y axis. The polarizing axis represents the direction of polarization of light passing through the polarizing plate. When the polarizing plate is rotated, the polarization direction has periodicity of 180° and the polarizing angle ranges from 0° to 180°. In this case, it is known that when a polarizing angle θpol in the observation of the maximum brightness Imax is defined as a phase angle φ, brightness I observed during a rotation of the polarizing plate can be expressed by formula (1) below.

[Math. 1]

$$I = \frac{I_{max} + I_{min}}{2} + \frac{I_{max} - I_{min}}{2} \cos(2\theta_{pol} - 2\phi) \qquad (1)$$

In formula (1), the polarizing angle θpol is determined during the generation of a polarized image and the maximum brightness Imax, the minimum brightness Imin, and the phase angle φ are variables. Thus, by fitting to a polarization model formula in formula (1) by using the brightness of a polarized image in three or more polarization directions, the brightness of a desired phase angle φ can be estimated on the basis of the polarization model formula indicating the relationship between brightness and a polarizing angle.

In this case, from the minimum brightness Imin and the maximum brightness Imax, a polarization degree ρ can be calculated as polarization information on the basis of formula (2). The polarization degree indicates the ratio of polarization in observed light.

[Math. 2]

$$\rho = \frac{I_{max} - I_{min}}{I_{max} + I_{min}} \qquad (2)$$

The polarization model formula expressed in formula (1) can be transformed into formula (3). If the polarization direction of a polarizing element is set at 45 degree intervals, for example, if the polarization direction at 0 degrees has brightness "I0", the polarization direction at 45 degrees has brightness "I1", the polarization direction at 90 degrees has brightness "I2", and the polarization direction at 135 degrees has brightness "I3", a coefficient a in formula (3) is a value expressed in formula (4). Coefficients b and c in formula (3) are values expressed in formulas (5) and (6).

[Math. 3]

$$I = a \cdot \sin(2 \cdot \theta) + b \cdot \cos(2 \cdot \theta) + c \qquad (3)$$

$$a = \frac{I_1 - I_3}{2} \qquad (4)$$

$$b = \frac{I_0 - I_2}{2} \qquad (5)$$

$$c = \frac{I_0 + I_1 + I_2 + I_3}{4} \qquad (6)$$

At this point, the polarization degree ρ can be calculated on the basis of formula (7). As polarization information, a polarization phase φp can be calculated on the basis of formula (8).

[Math. 4]

$$\rho = \frac{\sqrt{a^2 + b^2}}{c} \qquad (7)$$

$$\phi_p = \frac{1}{2} \tan^{-1}\left(\frac{a}{b}\right) \qquad (8)$$

The polarization information calculating unit 30 may calculate a Stokes's vector as polarization information. Formula (9) indicates a Stokes's vector S. Observed values I0, I45, I90, and I135 indicate observed values in the polarization directions at 0°, 45°, 90°, and 135°.

[Math. 5]

$$S = \begin{bmatrix} S_0 \\ S_1 \\ S_2 \end{bmatrix} \qquad (9)$$

In the Stokes's vector S, a component S0 indicates the brightness or mean brightness of non-polarized light as expressed in formula (10). A component S1 indicates a difference in intensity between the polarization directions of 0° and 90° as expressed in formula (11), and a component S2 indicates a difference in intensity between the polarization directions of 45° and 135° as expressed in formula (12).

[Math. 6]

$$S_0 = \frac{I_0 + I_{45} + I_{90} + I_{135}}{4} \qquad (10)$$

$$S_1 = \frac{I_0 - I_{90}}{2} \qquad (11)$$

$$S_2 = \frac{I_{45} - I_{135}}{2} \qquad (12)$$

The non-polarized image generating unit 40 generates a non-polarized image from a polarized image captured by the polarized imaging unit 20. The non-polarized image generating unit 40 performs the operation of formula (10) to generate the non-polarized image. In the presence of non-polarized pixels as illustrated in FIGS. 5A, 5B, 5C, 5D, 5E, 5F, 5G, 5H, 5I, 5J, 5K, and 5L, a non-polarized image may be generated by using pixel values generated by the non-polarized pixels. The non-polarized image generating unit 40 outputs the generated non-polarized image to the object specifying unit 50 and the output unit 70.

The object specifying unit 50 specifies the region of an object, for which a state change is to be detected, from a polarized image captured by the polarized imaging unit 20 or a non-polarized image generated by the non-polarized image generating unit 40.

The region of the object may be specified by a user or automatically specified on the basis of recognition. If a user specifies the region of an object, for example, an image is divided into regions in advance, and then the regions are specified such that the regions corresponding to at least one object are specified for each object by the user. Alternatively, a user may specify a border between the region of an object and other regions and specify at least one closed region as the region of the object.

If the region of an object is automatically specified on the basis of recognition, recognition is performed as in the conventional art by using a non-polarized image generated by the non-polarized image generating unit 40, and the recognized region of a desired subject is specified as the region of the object. The object specifying unit 50 may automatically extract only a region having a high polarization degree or automatically extract only a part where polarization information has changed on a time-series basis.

The state-change detecting unit 60 detects a state change of the object on the basis of a time series change of the polarization information, by using the polarization information on the region of the object specified by the object specifying unit 50 in the polarization information calculated by the polarization information calculating unit 30. For example, the state-change detecting unit 60 detects, as a state change, that a change of the polarization information becomes smaller than a predetermined change with the passage of time or a change of the polarization information becomes larger than the predetermined change. The state-change detecting unit 60 outputs the detection result of the state change to the output unit 70.

The output unit 70 outputs the detection result of the state change of the object. The output unit 70 outputs a state-change detection image, in which a state change of the object is represented as, for example, binary values or continuous values for each pixel, on the basis of the detection result of the state change, the detection result being generated by the state-change detecting unit 60. Alternatively, the output unit 70 may output a state-change detection image in which a state change of the object is represented as, for example, binary values or continuous values for each object, or output a state change as state change detection information, which includes binary values or continuous values, for each image including the object.

If a state change of the object is represented as, for example, binary values or continuous values for each object, the output unit 70 may perform, for example, image processing on a non-polarized image according to the detection result of the state change and output the image such that the non-polarized image generated by the non-polarized image generating unit 40 and the state-change detection result generated by the state-change detecting unit 60 are associated with each other.

2. Operation of Embodiment

Figure 6:
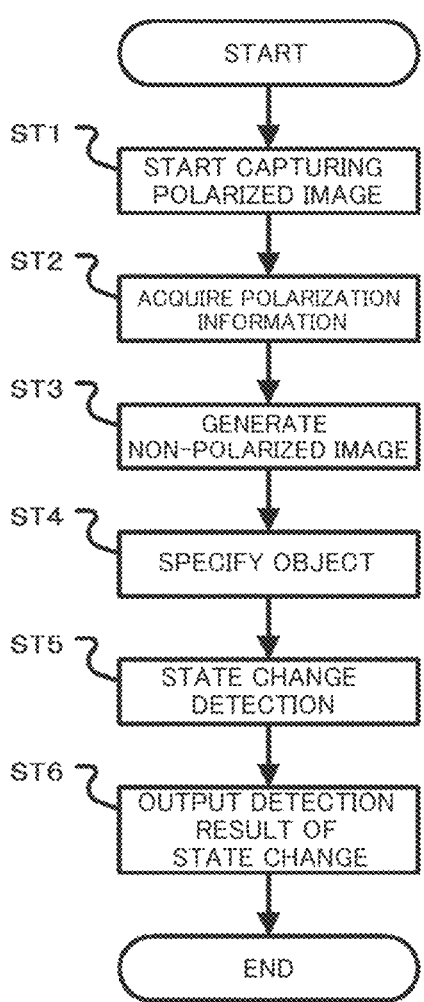
[FIGS. 6]

FIG. 6 is a flowchart showing the operations of the embodiment. In step ST1, the information processing system starts capturing a polarized image. The polarized imaging unit 20 of the information processing system 10 starts imaging to capture a polarized image and then advances to step ST2. The intervals of imaging by the polarized imaging unit 20 may be set at predetermined time intervals in advance or may be set according to a state change of an object. For example, in the case of a state change in a short time, the intervals of imaging are shortened, whereas in the case of a state change for a long time, the intervals of imaging are extended.

In step ST2, the information processing system acquires polarization information. The polarization information calculating unit 30 of the information processing system 10 calculates polarization information for each image, from polarized images that are sequentially captured by the polarized imaging unit 20. The polarization information calculating unit 30 calculates at least one piece of polarization information that changes according to a state change of the object. For example, the polarized imaging unit 20 calculates a polarization degree, a polarization phase, and a Stokes's vector and then advances to step ST3.

In step ST3, the information processing system generates a non-polarized image. The non-polarized image generating unit 40 of the information processing system 10 generates a non-polarized image from the polarized image captured in step ST1 and then advances to step ST4.

In step ST4, the information processing system specifies the object. The object specifying unit 50 of the information processing system 10 specifies the region of the object in the polarized image on the basis of a user instruction or recognition or the like and then advances to step ST5.

In step ST5, the information processing system detects a state change. The state-change detecting unit 60 of the information processing system 10 detects a state change of the object on the basis of, for example, the polarization information on the object specified in step ST4.

Figure 7:
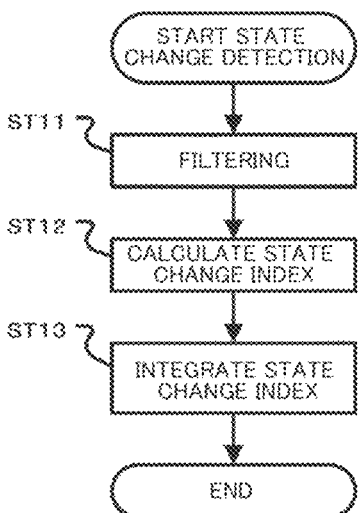
[FIGS. 7]

FIG. 7 is a flowchart showing the detection of a state change. In step ST11, the state-change detecting unit performs filtering. The state-change detecting unit 60 performs filtering on polarization information on the region of the object in a time direction or a spatial direction and removes noise. For example, the state-change detecting unit 60 performs filtering using an average filter, a median filter, and Gaussian or the like and then advances to step ST12. Since filtering in the time direction causes a delay, for example, the intervals of imaging of a polarized image may be adjusted to avoid the influence of a delay.

In step ST12, the state-change detecting unit calculates a state change index. The state-change detecting unit 60 calculates a state change index, which indicates a time-series change of polarization information, for each pixel or each piece of the polarization information. The state-change detecting unit 60 calculates a slope $s(x,y,p)$ of a change of polarization information $p(x,y)$ for a pixel $(x,y)$ for which a state change index is to be calculated. Furthermore, the state-change detecting unit 60 calculates a state change index $c(t,x,y,p)$ at time t on the basis of the slope $s(x,y,p)$.

If it is detected that a change of the polarization information has become smaller than a predetermined change with the passage of time, the state-change detecting unit 60 generates a state change index $c(t,x,y,p)$ as a binary value on the basis of formula (13) and formula (14). Furthermore, the state-change detecting unit 60 may generate a state change index $c(t,x,y,p)$ as a continuous value on the basis of formula (15).

[Math. 7]

$$c(t, x, y, p) = 1 \quad \text{if} \ |s(x, y, p)| \le Th1 \tag{13}$$

$$c(t, x, y, p) = 0 \quad \text{if} \ |s(x, y, p)| > Th1 \tag{14}$$

$$c(t, x, y, p) = 1 - \frac{|s(x, y, p)|}{\alpha} \tag{15}$$

Figures 8A, 8B, 8C, 8D:
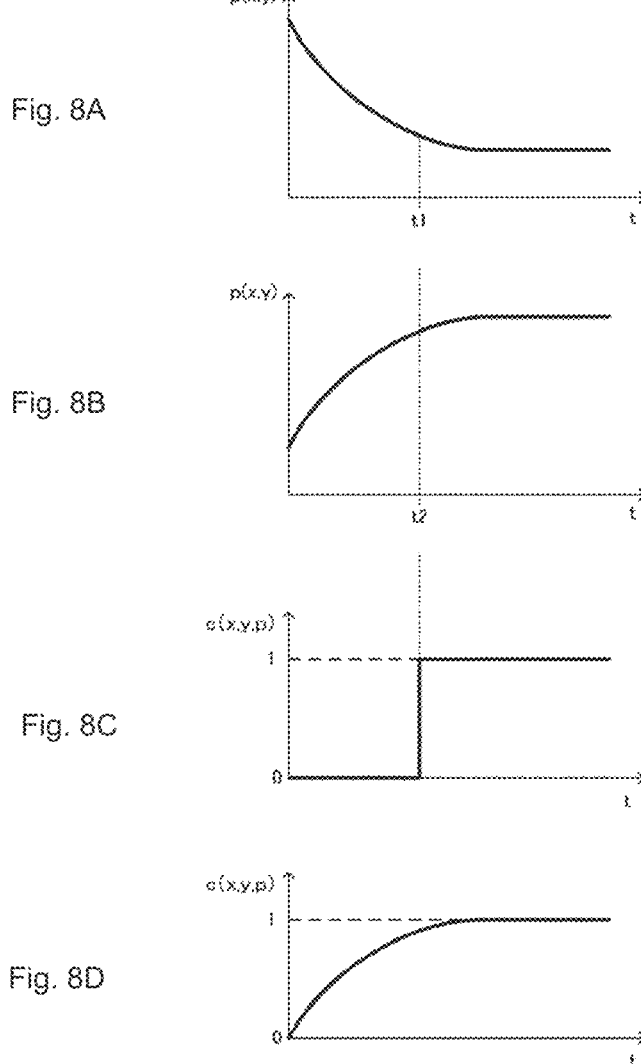
[FIGS. 8A, 8B, 8C, and 8D]

FIGS. 8A, 8B, 8C, and 8D illustrate operations if it is detected that a change of the polarization information has become smaller than the predetermined change with the passage of time. FIGS. 8A and 8B illustrate a change of the polarization information $p(x,y)$ over time. FIG. 8A illustrates that a reduction in the value of the polarization information $p(x,y)$ decreases with time. FIG. 8B illustrates that an increase in the polarization information $p(x,y)$ decreases with time.

If the state-change detecting unit 60 detects that the absolute value of the slope s(x,y,p) of a change of the polarization information p(x,y) over time in-FIG. 8A is equal to or lower than a threshold value Th1 at time t1 or if the state-change detecting unit 60 detects that the absolute value of the slope s(x,y,p) of a change of the polarization information p(x,y) over time in FIG. 8B is equal to or lower than the threshold value Th1 at time t2, a state change index c(x,y,p) changes from "0" to "1" on the basis of formulas (13) and (14) as indicated in FIG. 8C.

If a parameter α of formula (15) is set at the maximum value of the absolute value of the slope s(x,y,p) in advance, the state change index c(x,y,p) continuously changes from "0" to "1" on the basis of formula (15) as indicated in FIG. 8D.

If it is detected that a change of the polarization information has become larger than the predetermined change with the passage of time, the state-change detecting unit 60 generates the state change index c(t,x,y,p) as a binary value on the basis of formula (16) and formula (17). Furthermore, the state-change detecting unit 60 may generate the state change index c(t,x,y,p) as a continuous value on the basis of formula (18).

[Math. 8]

$$c(t, x, y, p) = 0 \quad \text{if} \ |s(x, y, p)| \le Th2 \tag{16}$$

$$c(t, x, y, p) = 1 \quad \text{if} \ |s(x, y, p)| > Th2 \tag{17}$$

$$c(t, x, y, p) = \frac{|s(x, y, p)|}{\beta} \tag{18}$$

Figures 9A, 9B, 9C, 9D:
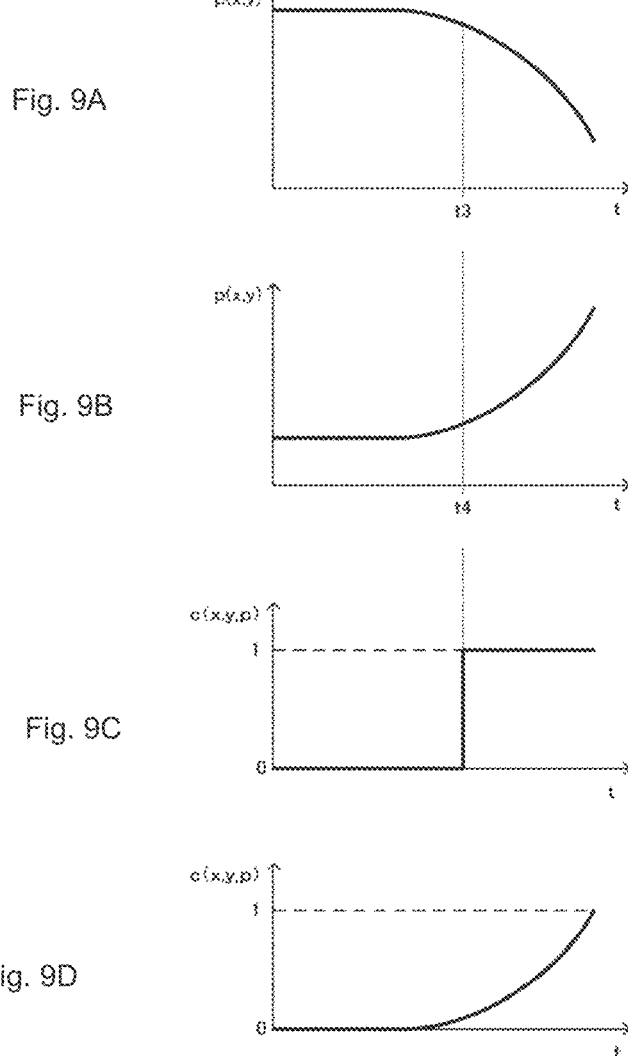
[FIGS. 9A, 9B, 9C, and 9D]

FIGS. 9A, 9B, 9C, and 9D illustrate operations if it is detected that a change of the polarization information has become larger than the predetermined change with the passage of time. FIGS. 9A and 9B illustrate a change of the polarization information p(x,y) over time. FIG. 9A illustrates that an increase in the value of the polarization information p(x,y) increases with time. FIG. 9B illustrates that a reduction in the polarization information p(x,y) increases with time.

If the state-change detecting unit 60 detects that the absolute value of the slope s(x,y,p) of a change of the polarization information p(x,y) over time in FIG. 9A is larger than a threshold value Th2 at time t3 or if the state-change detecting unit 60 detects that the absolute value of the slope s(x,y,p) of a change of the polarization information p(x,y) over time in FIG. 9B is larger than the threshold value Th2 at time t4, the state change index c(x,y,p) changes from "0" to "1" on the basis of formulas (16) and (17) as indicated in FIG. 9C.

If a parameter β of formula (18) is set at the maximum value of the absolute value of the slope s(x,y,p) in advance, the state change index c(x,y,p) continuously changes from "0" to "1" on the basis of formula (18) as indicated in FIG. 9D.

Alternatively, the state-change detecting unit 60 may set the state change index on the basis of the result of comparison between the polarization information and the predetermined threshold value regardless of a change of the polarization information. FIGS. 10A, 10B, 10C, and 10D illustrate the setting of the state change index on the basis of the result of comparison between the polarization information and the threshold value. For example, the state-change detecting unit 60 set the state change index at "0" when the polarization information is equal to or lower than the threshold value, and the state-change detecting unit 60 sets the state change index at "1" when the polarization information is larger than the threshold value.

FIGS. 10A and 10C indicate the polarization information p(x,y) on the pixel (x,y) at each time. For example, if the polarization information p(x,y) on the pixel (x,y) changes as indicated in FIG. 10A, as indicated in FIG. 10B, the state change index c(x,y,p) is "1" in a period during which the polarization information p(x,y) is larger than a threshold value Th3, and the state change index c(x,y,p) is "0" when the polarization information p(x,y) is equal to or lower than the threshold value Th3.

If the polarization information p(x,y) on the pixel (x,y) changes as indicated in FIG. 10C, as indicated in FIG. 10D, the state change index c(x,y,p) is "0" in a period during which the polarization information p(x,y) is equal to or lower than a threshold value Th4, and the state change index c(x,y,p) is "1" when the polarization information p(x,y) is larger than the threshold value Th4.

In this way, in each piece of the polarization information and each target region (or over an image), the state-change detecting unit 60 calculates the state change index for each pixel and calculates state change indexes as many as "(the number of pieces of polarization information)×(the number of pixels in a region)×(the number of regions ("1" for the overall image))".

In step ST13, the state-change detecting unit integrates state change indexes. The state-change detecting unit 60 integrates the state change indexes calculated in step ST12. The state change indexes are integrated for each piece of the polarization information, each pixel, each object region, or each image.

The state-change detecting unit 60 integrates the state change indexes according to any one of the following methods. The integrated state change index serves as the detection result of a state change of the object.

In the first method, integration is performed according to (the number of pieces of polarization information) and the integrated state change index for each pixel in the region of the object serves as the detection result of a state change of the object. For example, the state change indexes of a pixel(xi,yi) of a region Rj at time t are integrated on the basis of, for example, formula (19). In the integration of the state change indexes of the pixel(xi,yi) of the region Rj at time t, the maximum value may be calculated as indicated by formula (20), the minimum value may be calculated as indicated by formula (21), or a median value may be calculated as indicated by formula (22). Furthermore, in the integration of the state change indexes, a mean value or statistics such as a mode may be calculated. In formula (19), a weight Wp1 of the polarization information is a weight for polarization information p1 and a weight Wpn is a weight for polarization information pn. The polarization information with high reliability has a large weight. For example, if polarization information includes polarization and a polarization phase, the polarization degree frequently changes according to a state change, and the polarization phase is susceptible to noise. Thus, a weight Wpb for a polarization phase is expressed as "Lb=(1−La):(La>Lb)" where "La" is a weight Wpa for a polarization degree. If a Stokes's vector is further used as the polarization information, a weight Wps1 is set for a component S1 representing polarization, and a weight Wps2 is set for a component S2. For example, the weight Wpa=0.7, the weight Wpb=0.1, the weight Wps1=0.1, and the weight Wps2=0.1 are set. The weight is normalized in advance according to the number of pieces of polarization information.

[Math. 9]

$$c(t,R_j,x_j,y_i)=w_{p1}c(t,R_j,x_i,y_i,p_1)+w_{p2}c(t,R_j,x_i,y_i, \\ p_2),\ldots,+w_{pn}c(t,R_j,x_i,y_i,p_n)) \qquad (19)$$

$$c(t,R_j,x_i,y_i)=\max(c(t,R_j,x_i,y_i,p_1),c(t,R_j,x_i,y_i, \\ p_2),\ldots,c(t,R_j,x_i,y_i,p_n)) \qquad (20)$$

$$c(t,R_j,x_i,y_i)=\min(c(t,R_j,x_i,y_i,p_1),c(t,R_j,x_i,y_i, \\ p_2),\ldots,c(t,R_j,x_i,y_i,p_n)) \qquad (21)$$

$$c(t,R_j,x_i,y_i)=\text{median}((c(t,R_j,x_i,y_i,p_1),c(t,R_j,x_i,y_i, \\ p_2),\ldots,c(t,R_j,x_i,y_i,p_n)) \qquad (22)$$

In the second method, integration is performed on (the number of pieces of polarization information)×(the number of pixels in a region) and the integrated state change index for each region serves as the detection result of a state change of the object. For example, the state change indexes of the region $R_j$ at time t are integrated on the basis of formula (23) or (24). As indicated by formula (24), the minimum value, a median value, a mean value, or other statistics such as a mode may be calculated in addition to the maximum value. In formula (23), for example, a weight Wi1 is a weight for a pixel (xi1,yi1) and a weight Win is a weight for a pixel (xin,yin). The weights Wi1 to Win refer to the reciprocal of a distance from the barycenter of a region, a probability density function for a Gaussian distribution or the like, a polarization degree, or other values of the polarization information. The weights are normalized in advance because the number of pixels varies among regions.

[Math. 10]

$$c(t,R_j)=w_{i1}c(t,R_j,x_{i1},y_{i1})+w_{i2}c(t,R_j,x_{i2},y_{i2}),\ldots,+w_{in}c \\ (t,R_j,x_{in},y_{in}) \qquad (23)$$

$$c(t,R_j)=\max(c(t,R_j,x_{i1},y_{i1}),c(t,R_j,x_{i2},y_{i2}),\ldots,c(t,R_j,x_{in}, \\ y_{in})) \qquad (24)$$

In the third method, integration is performed on (the number of pieces of polarization information)×(the number of pixels in a region)×(the number of regions) and a single state change index for an image serves as the detection result of a state change. For example, the state change indexes of the overall image at time t are integrated on the basis of formula (25) or (26). As indicated by formula (26), the minimum value, a median value, a mean value, or other statistics such as a mode may be calculated in addition to the maximum value. In formula (25), for example, a weight WR1 is a weight set for a region R1 and a weight WRn is a weight set for a region Rn. The weights WR1 to WRn are set on the basis of the number of pixels in the region, the mean polarization degree in the region, and other values of the polarization information. The weights are normalized in advance because the number of regions varies among images.

[Math. 11]

$$c(t)=w_{R1}c(t,R_1)+w_{R2}c(t,R_2),\ldots,+w_{Rn}c(t,R_n) \qquad (25)$$

$$c(t)=\max(c(t,R_1),c(t,R_2),\ldots,c(t,R_n)) \qquad (26)$$

As described above, the state change indexes are integrated in the order of (the number of pieces of polarization information)→(the number of pixels in a region)→(the number of regions). The order may be changed to (the number of pixels in a region)→(the number of regions)→(the number of pieces of polarization information).

Referring to FIG. 6 again, the information processing system outputs the detection result of a state change in step ST6. The output unit 70 of the information processing system 10 outputs the detection result of a state change, the detection result being generated by the state-change detecting unit 60.

When outputting the detection result of a state change, the output unit 70 outputs the detection result of a state change alone. Alternatively, the output unit 70 may output the detection result associated with a non-polarized image. For example, the output unit 70 may perform image processing on a non-polarized image according to the detection result of a state change, change the display attributes (for example, at least any one of brightness, hue, and saturation) of the non-polarized image according to the detection result of a state change, and superimpose an image of the detection result of a state change on the non-polarized image.

If the detection result of a state change is obtained for each pixel, the output unit 70 changes, for example, the display attributes of pixels corresponding to the non-polarized image according to the detection result of a state change. If the detection result of a state change is obtained for each region, the output unit 70 may change the display attributes of a region corresponding to the non-polarized image according to the detection result of a state change and superimpose an image corresponding to the detection result of a state change on a region corresponding to polarized image. If the detection result of a state change is obtained for each image, the output unit 70 adds information on the detection result of a state change to the non-polarized image.

FIGS. 11A, 11B, 11C, and 11D illustrate the output of the detection result of a state change alone. In FIGS. 11A, 11B, 11C, and 11D, two objects OB1 and OB2 are included in a polarized image. In FIGS. 11A and 11B, only the detection result of a state change is outputted for each pixel. In (c) and (d) of FIGS. 11C and 11D, only the detection result of a state change is outputted for each region of the objects OB1 and OB2. In FIGS. 11A and 11C, the detection result of a state change is "0" or "1" in binary notation. In FIGS. 11B and 11D, the detection result of a state change is a value ranging from "0" to "1".

Figures 12A, 12B, 12C, 12D, 12E, 12F:
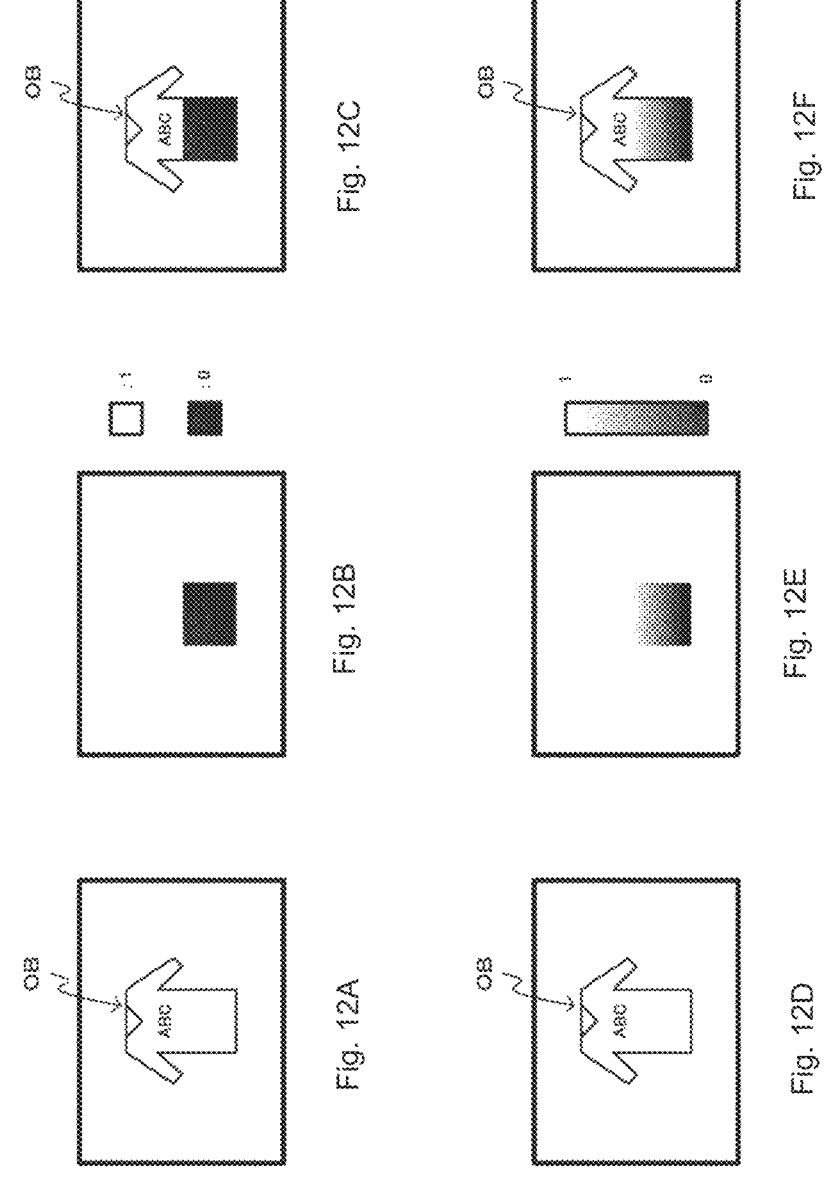
[FIGS. 12A, 12B, 12C, 12D, 12E, and 12F]

FIGS. 12A, 12B, 12C, 12D, 12E, and 12F illustrate the detection result of a state change and a non-polarized image that are outputted while being associated with each other. FIGS. 12A and FIG. 12D each illustrate a non-polarized image. An object OB is, for example, a shirt. A wet shirt has a high polarization degree, whereas a dry shirt has a low polarization degree.

FIGS. 12B and FIG. 12E each illustrate the detection result of a state change. In FIG. 12B, the detection result of a state change is "0" or "1" in binary notation. In FIG. 12E, the detection result of a state change is a value ranging from "0" to "1".

If the detection result of a state change is "0" or "1" in binary notation, the output unit 70 performs image processing on the non-polarized image in FIG. 12A according to the detection result of a state change in FIG. 12B and outputs the image of FIG. 12C such that the detection result of a state change is associated with the non-polarized image.

If the detection result of a state change is a value ranging from "0" to "1", the output unit 70 performs image processing on the non-polarized image in FIG. 12D according to the detection result of a state change in FIG. 12E and outputs the image of FIG. 12E such that the detection result of a state change is associated with the non-polarized image.

In this way, as the wet shirt is dried, the polarization degree decreases, so that the dry shirt has a low polarization degree. As indicated in FIGS. 8A, 8B, 8C, and 8D, the detection result of a state change changes from "0" to "1" or continuously changes from "0" to "1". Thus, the information processing system 10 can indicate a dry state of the shirt as a numeric value or the result of image processing on the non-polarized image.

The present technique can easily identify a state change of an object on the basis of polarization information. The detection result of a state change can be outputted while being associated with a non-polarized image, thereby easily identifying the type of an object, the position of a state change on the object, and the type of the state change, for example, a dry state of laundry or the like.

3. Application Examples

The operations of the foregoing embodiment illustrated the detection of a state change of laundry. The embodiment is applicable to the observations of various objects as long as the state change to be observed is accompanied by the polarization information change. For example, the embodiment can detect a dry state of shoes, a floor, or a surface coated with a paint or an adhesive and whether laundry is liquid-wetted in contact with rain or melted ice. Moreover, if polarization information is changed by surface deterioration, corrosion, or friction or the like, the embodiment can identify deterioration, corrosion, friction, and metal fatigue or the like of a facility or equipment from a remote location on the basis of the polarized images of the facility or equipment, the polarized images being captured at predetermined time intervals.

By capturing polarized images of a road or the like at predetermined time intervals, a state of the road can be identified from a dry state, a wet state, and a frozen state on the basis of the polarized images. This can precisely and easily manage road conditions.

Furthermore, the information processing system of the present technique enables the output of a non-polarized image in addition to the detection of a state change and thus is usable in the field of monitoring, for example, theft prevention, the detection of a suspicious person, and monitoring of pets. Although a non-polarized image is ordinarily outputted, the detection result of a state change is associated with the outputted non-polarized image only when the detection of a state change is necessary (for example, when the function of detecting a state change is enabled).

The series of processing described in the specification can be executed by hardware, software, or a composite configuration thereof. When the processing is executed by software, a program in which a processing sequence has been recorded is executed after being installed in a memory in a computer embedded in dedicated hardware. Alternatively, the program can be executed after being installed in a general-purpose computer capable of executing various types of processing.

For example, the program can be recorded in advance on a hard disk as a recording medium, an SSD (Solid State Drive), or a ROM (Read Only Memory). Alternatively, the program can be temporarily or permanently stored (recorded) in a removable recording medium such as a flexible disc, a CD-ROM (Compact Disc Read Only Memory), an MO (Magneto Optical) disc, a DVD (Digital Versatile Disc), a BD (Blu-Ray Disc (registered trademark)), a magnetic disk, or a semiconductor memory card. The removable recording medium can be provided as so-called package software.

The program may be transferred from a download site to a computer wirelessly or by wire via a network such as WAN (Wide Area Network) typified by a cellular system, a LAN (Local Area Network), or the Internet, in addition to being installed in the computer from the removable recording medium. The computer can receive the program transmitted in this manner and install the program in a recording medium such as a built-in hard disk.

The effects described in the present specification are merely examples and are not limited, and there may be additional effects not described. Furthermore, the present technique should not be construed as being limited to the embodiment described above. The embodiment of the present technique discloses the present technique in the form of examples, and it is obvious that a person skilled in the art could modify or substitute the embodiment without departing from the gist of the present technique. In other words, claims should be taken into consideration to determine the gist of the present technique.

The information processing device of the present technique can also have the following configurations.

(1) An information processing device including: a polarization information calculating unit that calculates polarization information for each polarized image from time-series polarized images of an object; and a state-change detecting unit that detects a state change of the object on the basis of a time series change of the polarization information calculated by the polarization information calculating unit.

(2) The information processing device according to (1), wherein the state-change detecting unit calculates a state change index indicating the time series change of the polarization information and detects the state change of the object on the basis of the state change index.

(3) The information processing device according to (2), wherein the state-change detecting unit calculates the state change index for each pixel position of the polarized image.

(4) The information processing device according to (2) or (3), wherein the polarization information calculating unit calculates different pieces of polarization information, and the state-change detecting unit calculates the state change index for each piece of the polarization information.

(5) The information processing device according to any one of (2) to (4), wherein the state-change detecting unit integrates the state change indexes and detects the state change of the object on the basis of the integrated state change index.

(6) The information processing device according to (5), wherein the state-change detecting unit assigns a weight to the state change index and integrates the state change indexes assigned with weights.

(7) The information processing device according to (6), wherein the state-change detecting unit increases a weight of polarization information having high reliability.

(8) The information processing device according to (6) or (7), wherein the state-change detecting unit sets a weight for each pixel in an image region indicating the object or each image region indicating the object.

(9) The information processing device according to any one of (5) to (8), wherein the state-change detecting unit integrates the state change indexes for each pixel position of the polarized image.

(10) The information processing device according to any one of (5) to (9), wherein the state-change detecting unit integrates the state change indexes for each object in the polarized image.

The information processing device according to claim 5.

(11) The information processing device according to any one of (2) to (10), wherein the state-change detecting unit detects, as detection of a state change of the object, that a change of the polarization information becomes smaller than a predetermined change with the passage of time or a change of the polarization information becomes larger than the predetermined change.

(12) The information processing device according to any one of (2) to (11), further including an object specifying unit that specifies an image region of the object in the polarized image, wherein a state change is detected on the basis of the state change index of the image region of the object specified by the object specifying unit.

The information processing device according to claim 2.

(13) The information processing device according to (12), further including a non-polarized image generating unit that generates a non-polarized image from the polarized image, wherein the object specifying unit performs recognition by using the non-polarized image generated by the non-polarized image generating unit and specifies the image region of the object.

(14) The information processing device according to any one of (1) to (13), further including an output unit that outputs the detection result of a state change of the object, the detection result being obtained by the state-change detecting unit.

(15) The information processing device according to (14), further including a non-polarized image generating unit that generates a non-polarized image from the polarized image, wherein the output unit outputs the non-polarized image such that the detection result of the state change is associated with the non-polarized image generated by the non-polarized image generating unit, the detection result being obtained by the state-change detecting unit.

(16) The information processing device according to (15), wherein the output unit performs, according to the detection result of the state change, image processing on the non-polarized image generated by the non-polarized image generating unit and outputs the non-polarized image.

REFERENCE SIGNS LIST

10 Information processing system
20 Polarized imaging unit
30 Polarization information calculating unit
40 Non-polarized image generating unit
50 Object specifying unit
60 State-change detecting unit
70 Output unit
201 Image sensor
202 Polarizing filter
203 Lens
204, 211, 212-1 to 212-4 Polarizing plate
210, 210-1 to 210-4 Imaging unit

The invention claimed is:

1. An information processing device, comprising:
a central processing unit (CPU) configured to:
calculate polarization information for each polarized image of a plurality of time-series polarized images of an object;
calculate a state change index indicating a time series change of the polarization information; and
detect a state change of the object based on the state change index.

2. The information processing device according to claim 1, wherein the CPU is further configured to calculate the state change index for each pixel position of a polarized image of the plurality of time-series polarized images.

3. The information processing device according to claim 1, wherein the CPU is further configured to:
calculate different pieces of the polarization information; and
calculate the state change index for each piece of the polarization information.

4. The information processing device according to claim 1, wherein the CPU is further configured to:
integrate a plurality of state change indexes; and
detect the state change of the object based on the integrated plurality of state change indexes.

5. The information processing device according to claim 4, wherein the CPU is further configured to:
assign a weight to each state change index of the plurality of state change indexes.

6. The information processing device according to claim 1, wherein the CPU is further configured to determine a weight of the polarization information, wherein the polarization information with highest reliability has a highest weight.

7. The information processing device according to claim 5, wherein
the CPU is further configured to set a weight for one of each pixel in an image region indicating the object or each image region of a plurality of image regions indicating the object.

8. The information processing device according to claim 4, wherein the CPU is further configured to integrate the plurality of state change indexes for each pixel position of a polarized image of the plurality of time-series polarized images.

9. The information processing device according to claim 4, wherein the CPU is further configured to integrate the plurality of state change indexes for each object in a polarized image of the plurality of time-series polarized images.

10. The information processing device according to claim 1, wherein the CPU is further configured to detect, as the detection of the state change of the object, one of the time series change of the polarization information becomes smaller than a specific change with passage of time or the time series change of the polarization information becomes larger than the specific change with the passage of time.

11. The information processing device according to claim 1, wherein the CPU is further configured to:
specify an image region of the object in a polarized image of the plurality of time-series polarized images; and
detect the state change based on a basis of the state change index of the specified image region of the object.

12. The information processing device according to claim 11, wherein the CPU is further configured to:
generate a non-polarized image from the polarized image; and
perform recognition based on the generated non-polarized image to specify the image region of the object.

13. The information processing device according to claim 1, further comprising an output unit that outputs a detection result of a state change of the object, the detection result being obtained by the state-change detecting unit.

14. The information processing device according to claim 13, further comprising a non-polarized image generating unit that generates a non-polarized image from the polarized image,
wherein the output unit outputs the non-polarized image such that the detection result of the state change is associated with the non-polarized image generated by the non-polarized image generating unit, the detection result being obtained by the state-change detecting unit.

15. The information processing device according to claim 14, wherein the output unit performs, according to the detection result of the state change, image processing on the non-polarized image generated by the non-polarized image generating unit and outputs the non-polarized image.

16. An information processing method, comprising:

calculating polarization information for each polarized image of a plurality of time-series polarized images of an object;

calculating a state change index indicating a time series change of the polarization information; and detecting a state change of the object based on the state change index.

17. A non-transitory computer-readable medium having stored thereon, computer-executable instructions which, when executed by a computer, cause the computer to execute operations, the operations comprising:

calculating polarization information for each polarized image of a plurality of time-series polarized images of an object;

calculating a state change index indicating a time series change of the polarization information; and detecting a state change of the object based on the state change index.

* * * * *